United States Patent [19]
Mitchell

[11] 4,385,770
[45] May 31, 1983

[54] MOTORCYCLE SIDECAR

[76] Inventor: Wallace F. Mitchell, Rte. 60 and St. Mary's Rd., Rte. #1 Box #37, P.O. Box 267, Libertyville, Ill. 60048

[21] Appl. No.: 231,988

[22] Filed: Feb. 6, 1981

[51] Int. Cl.³ .............................................. B62K 27/00
[52] U.S. Cl. ................................................ 280/203
[58] Field of Search ........................................ 280/203

[56] References Cited

U.S. PATENT DOCUMENTS

| 1,332,042 | 2/1920 | Johnston | 280/203 |
| 2,702,196 | 2/1955 | Gamaunt | 280/203 |
| 4,078,815 | 3/1978 | Vetter | 280/203 |

FOREIGN PATENT DOCUMENTS 5500  11/1909  United Kingdom ............... 280/203

Primary Examiner—Joseph F. Peters, Jr.
Assistant Examiner—Donn McGiehan
Attorney, Agent, or Firm—Edmond T. Patnaude

[57] ABSTRACT

There is disclosed a sidecar having a self-adjusting castering wheel located forwardly of the rear wheel of the associated motorcycle and which, together with the sidecar, is connected by a parallelogram linkage to the frame of the motorcycle so as to lean in substantial union with the motorcycle and the sidecar body.

28 Claims, 9 Drawing Figures

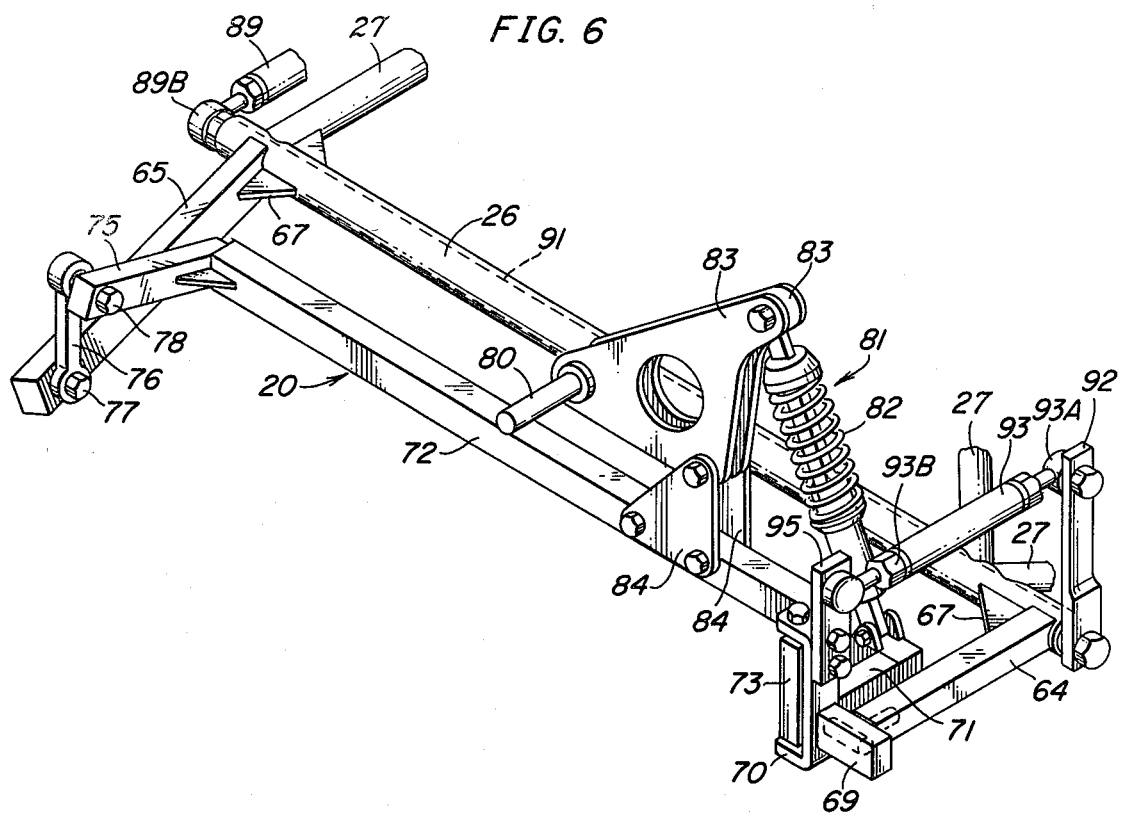
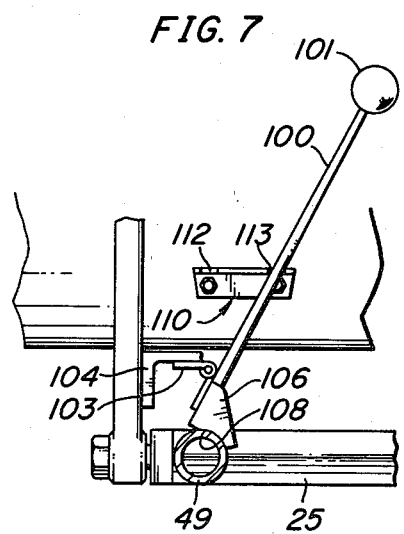
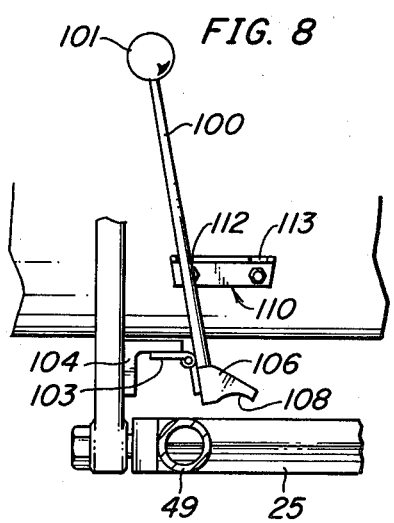
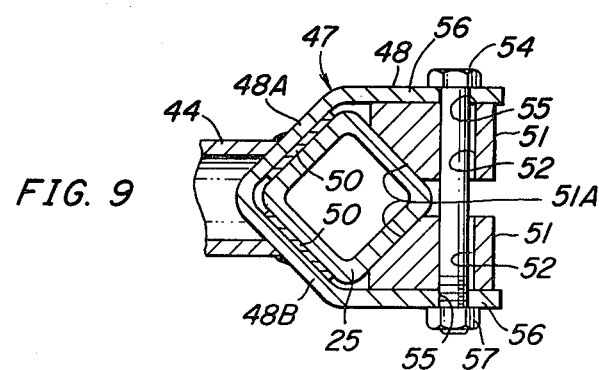

MOTORCYCLE SIDECAR

The present invention relates in general to motorcycle sidecars of the type having a steerable wheel, and it relates in particular to a new and improved sidecar which in a preferred embodiment includes a castering wheel mounted to the frame of the sidecar by a novel self-balancing hinge.

BACKGROUND OF THE INVENTION

Motorcycle sidecars have, for the most part, employed a single wheel journaled for rotation about a fixed horizontal axis which is usually aligned with the rear axle of the associated motorcycle. The frames of such sidecars are rigidly fixed to the frames of the associated motorcycles which precludes riding of the motorcycle in the usual manner inasmuch as the motorcycle cannot be leaned into a turn. Moreover, such sidecars are unstable because the weight of the passenger is forward of the sidecar wheel.

Attempts have been made to improve the stability of sidecars by moving the wheel forward of the rear wheel of the associated motorcycle. This has resulted, however, in scuffing or drag of the sidecar wheel during turning. Attempts to alleviate this problem have included the use of linkages connected between the front wheel assembly of the motorcycle and a steerable sidecar wheel. Because the front wheel of the motorcycle and the sidecar wheel have mutually different turning radii and these radii vary with changes in speed of the motorcycle it has not been possible to prevent scuffing or dragging of steerable sidecar wheels under all driving conditions.

The principal object of the present invention has been, therefore, to provide a new and improved motorcycle sidecar which enables the associated motorcycle to be driven in substantially the same manner as when the sidecar is not present, i.e., the sidecar causes little, if any, drag during turning, permits leaning of the motorcycle in the normal manner and does not cause any instability which might cause the cyclist to lose control of the motorcycle.

SUMMARY OF THE INVENTION

Briefly, there is provided in accordance with the present invention a motorcycle sidecar which is mounted to the frame of the associated motorcycle by a parallelogram linkage so that the body of the sidecar and the sidecar wheel lean with the motorcycle. The frame of the sidecar is steered in response to a lean of the motorcycle frame, and the sidecar wheel is mounted by a self-adjusting castering assembly to the frame of the sidecar. In addition, the castering frame is connected at the rear to the frame of the sidecar by a novel self-balancing, stable hinge which permits the sidecar wheel to self-adjust for perfect positioning during forward movement of the sidecar irrespective of the speed and angle of lean of the motorcycle.

In accordance with other aspects of the invention a manually operable locking mechanism is provided for locking the sidecar and motorcycle together in an upright position to facilitate parking thereof. Also, the sidecar wheel is located a substantial distance forward of the axis of the rear wheel of the associated motorcycle, and a novel clamp provides a rigid connection between the frame of the sidecar and the frame of the motorcycle.

GENERAL DESCRIPTION OF THE DRAWINGS

The present invention will be better understood by a reading of the following detailed description taken in connection with the accompanying drawings wherein:

FIG. 6 is a perspective view of the castering assembly of the sidecar shown in FIG. 1;

FIGS. 7 and 8 are side views respectively showing the locking mechanism in the locked and unlocked positions; and FIG. 9 is a cross-sectional view of one of the frame clamps taken along the line 9—9 in FIG. 3.

DETAILED DESCRIPTION OF THE INVENTION

Figure 1:
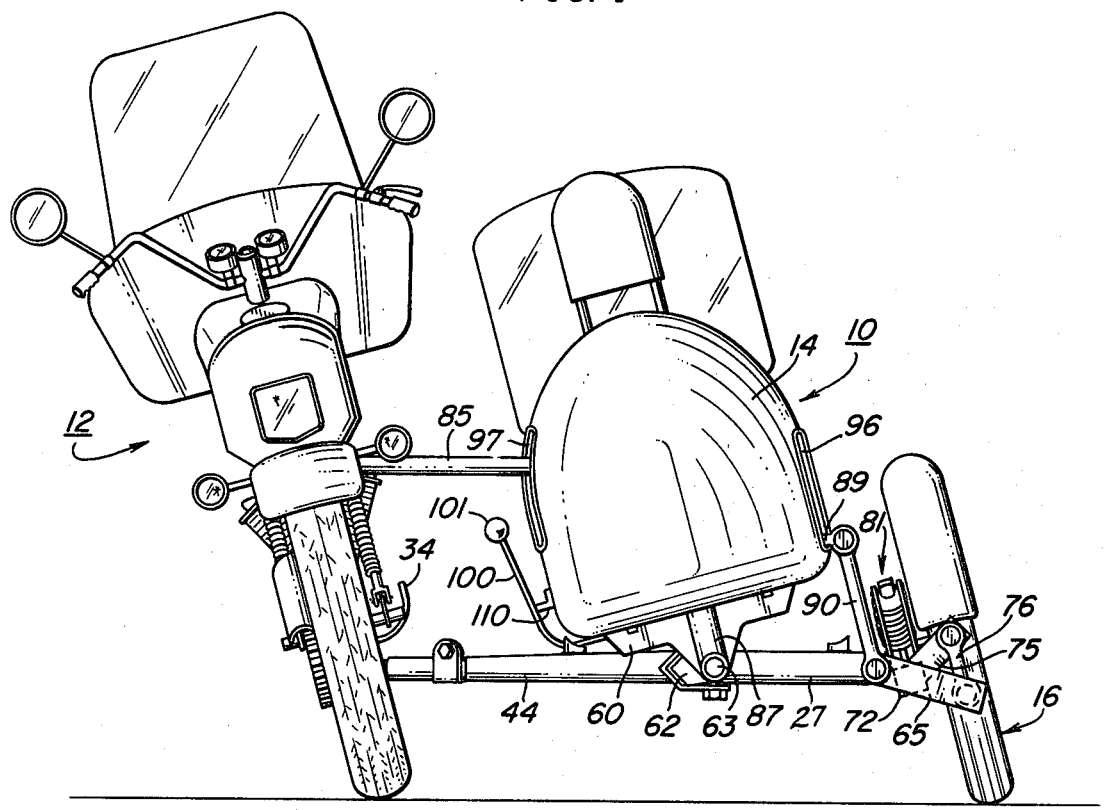
FIG. 1 is a rear view of a motorcycle and sidecar embodying the present invention.

Referring to FIG. 1, a sidecar 10 embodying the present invention is mounted to the frame of a motorcycle 12 in a manner more fully described hereinafter so that the sidecar body 14 and the sidecar wheel 16 by which it is supported remain in substantial parallelism with the frame of the motorcycle as it leans one way or the other with respect to the true vertical plane. The sidecar 10 includes a rigid main frame 18, best shown in FIG. 3, which is connected to the motorcycle frame so as to turn or steer in response to a lean of the motorcycle frame. The frame 18 is substantially planar and remains parallel to the plane defined by the road engaging surfaces of the tires of the motorcycle and the tire on the sidecar wheel 16. The sidecar wheel 16 is journaled for rotation to a castering assembly 20 mounted to the sidecar frame 18 whereby the wheel 16 steers as well as leans in response to a lean of the motorcycle. In addition, however, the castering assembly permits the wheel 16 to caster so as to align its axis of rotation with the turning axis of the motorcycle wheels.

Lateral movement of the rear end of the castering assembly 20 is controlled by means of a gravity hinge 22 which permits lateral movement of the rear and of the castering assembly but limits such movement with respect to the angle of lean of the wheel 16 which is itself controlled by gravity and the centrifugal force exerted on it. This controlled lateral movement of the castering assembly is important to prevent the caster assembly from swinging in an uncontrolled manner to one side or the other which would cause the cyclist to lose control of the motorcycle.

Considered in greater detail, the sidecar frame 18 includes an elongated main support bar 25, which is square in cross-section and lies parallel to the frame of the motorcycle, and a tubular fore and aft frame member 26 rigidly connected to the bar 25 by a plurality of tubular arms 27 welded at their respective ends to the bar 25 and the bar 26. The main support bar 25 is connected near its front end to the frame of the associated motorcycle by means of a linkage assembly 28 which is used to adjust the alignment of the sidecar frame with the frame of the motorcycle. In addition, the linkage assembly 28 steers the sidecar frame 18 in response to a lean of the motorcycle.

Figure 2:
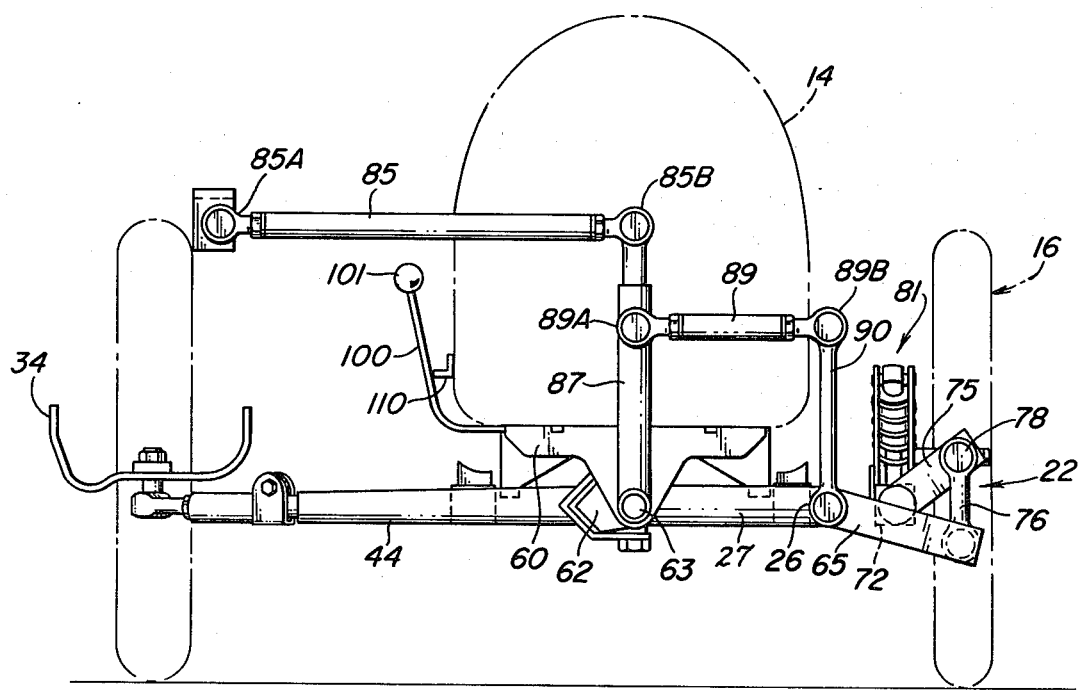
FIG. 2 is a rear view of the frame and linkages of the sidecar shown in FIG. 1.
Figure 4:
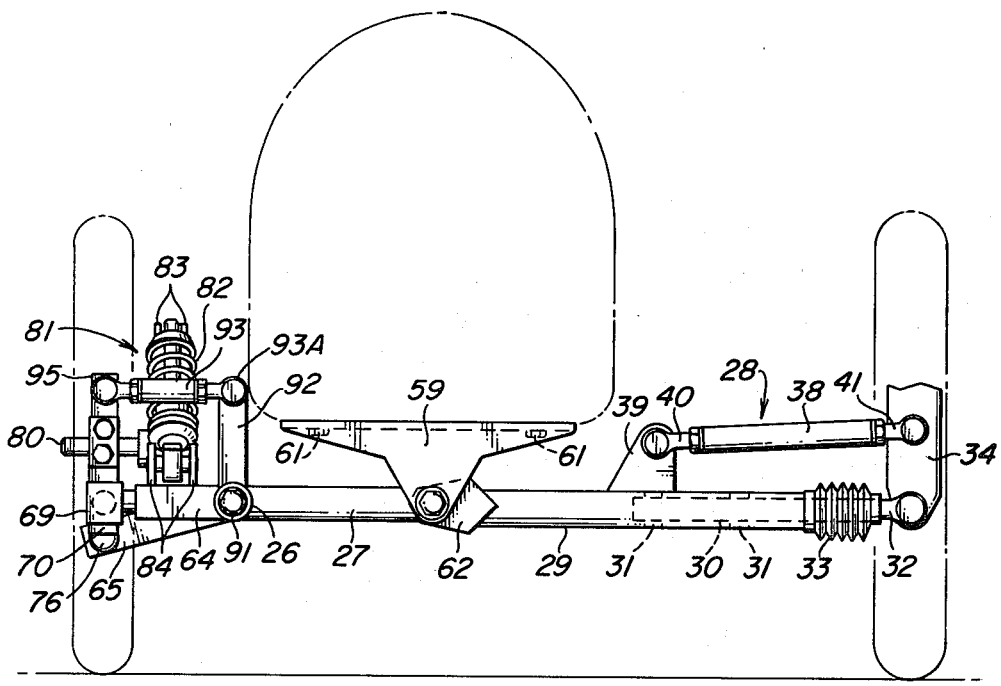
FIG. 4 is a front view of the frame and linkages of the sidecar shown in FIG. 1.
Figure 5:
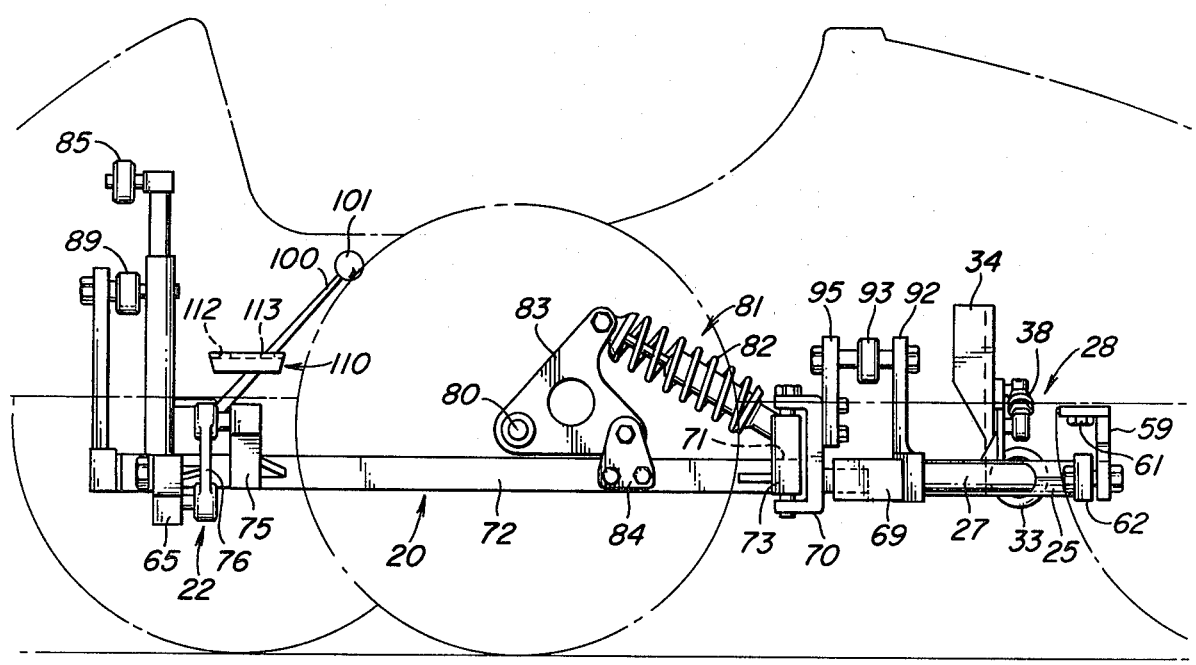
FIG. 5 is a side view of the frame and linkages of the sidecar shown in FIG. 1.

Referring particularly to FIGS. 2 and 4, the linkage assembly 28 may be seen to comprise an outer support tube 29 in which an inner support tube 30 is slidably carried by a plurality of longitudinally spaced bushings 31 affixed to the inner support tube. A tie rod end fitting 32 is fixedly connected in the end of the inner support tube 30 and a dirt boot 33 is connected between the outer tube 29 and the fitting 32. A grease fitting is provided for lubricating the bushings 31. The tie rod end fitting 32 is bolted to the frame 34 of the motorcycle and includes a ball and socket connector to permit the tubes 29 and 30 to pivot in both the horizontal and vertical directions relative to the frame. The outboard end of the support tube 29 is affixed, as by welding, to the main support bar 25 of the sidecar frame. For added strength, a tubular brace 36 is welded at its ends to the bar 25 and to the support tube 29. It may thus be seen that the telescoping tubes 29 and 30 permit the forward end of the sidecar frame to move towards and away from the motorcycle frame.

In order to cause such in and out steering movement in response to the leaning of the motorcycle, a sidecar steering control link 38 (FIG. 4) is connected between a bracket plate 39 extending upwardly from the support tube 29 and a location on the motorcycle frame above the location at which the fitting 32 is connected thereto. As shown, the bracket 39 is welded to the top of the support tube 29 and the link 38 is provided at its ends with tie rod end fittings 40 and 41 respectively connected to the link body by right hand and left hand threads to permit adjustment of the length of the link 38. In addition to controlling the steering of the sidecar frame, the link 38 also enables adjustment of the sidecar frame alignment by rotating the body relative to the fittings 40 and 41. The fittings 40 and 41 are conventional tie rod end fittings and like the other tie rod end fittings employed in the sidecar include ball and socket connections permitting horizontal and vertical movement of the link 38 relative to the bracket 39 and the motorcycle frame to which it is bolted. Referring to FIG. 4, it may be seen that leaning of the motorcycle in a counterclockwise direction toward the sidecar will cause the front of the sidecar frame to move away from the motorcycle and thus steer to the left as viewed in FIG. 4. Leaning the motorcycle in the clockwise direction will cause the sidecar frame to steer to the right. The optimum degree of steering for a particular angle of lean will differ with the size of the motorcycle and the manner in which it is usually driven.

Figure 3:
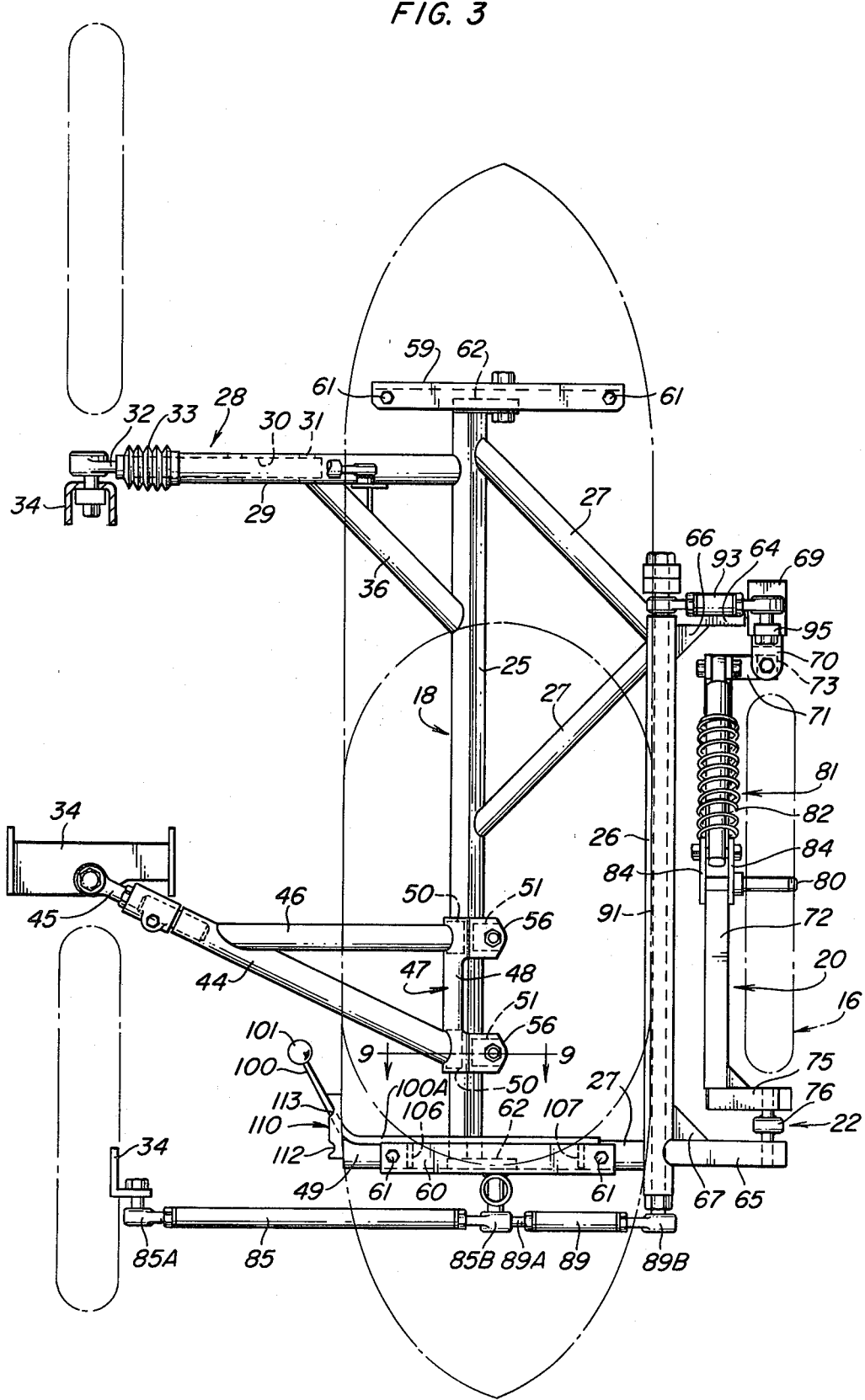
FIG. 3 is a plan view of the frame and linkages shown in FIG. 2.

As shown in FIG. 3, the sidecar frame 18 is connected near its rear end to the frame 34 of the motorcycle by a tubular support arm 44 having a conventional tie rod end fitting 45 threadedly secured in the end thereof and bolted to the main frame 34. The arm 44 and a tubular cross brace 46 are welded to a frame clamp assembly 47 which is removably attached to the main support bar 25 in a manner which prevents relative movement between the tubes 44 and 46 and the bar 25. However, the tubes 44 and 46 are adjustable in a fore and aft direction along the bar 25 to permit use of the sidecar with different sizes and designs of motorcycles.

The frame clamp assembly 47 includes an elongated channel-like body member 48 having flat portions 48A and 48B which meet at a ninety degree angle. Two sets of bearing plates 50 are welded to the inner sides of the portions 48A and 48B for engagement with the bar 25, and two sets of clamp blocks 51 are provided with bearing surfaces 51A for engagement with the other surfaces of the bar 25. The blocks 51 are provided with holes 52 for receiving a respective one of a pair of clamping bolts 54 which extend through aligned holes 55 in arms 56 of the body member 48. It may be seen that as nuts 57 are tightened onto the bolts 54 the arms 56 are squeezed together to force the blocks 51 tightly against the bar 25. The bearing surfaces on the bearing plates 50 and on the blocks 51 thus positively lock the support tube 44 and the brace 46 in a plane parallel to that of the sidecar frame 18 and thereby prevent uncontrolled movement of the sidecar relative to the motorcycle frame.

The body 14 of the sidecar is fixedly mounted on fore and aft body mounts 59 and 60 by a plurality of nut and bolt assemblies 61. The body mounts 59 and 60 are mounted to the bar 25 by bracket members 62 for free pivotal movement about a fore and aft horizontal axis 63 offset a short distance to the outboard side of the bar 25.

In order to mount the castering assembly 20 to the sidecar frame 18, a pair of rigid arms 64 and 65 extend outwardly from the tubular support member 36 and as best shown in FIG. 6 are held in position by a pair of triangular braces 66 and 67. The forward arm 64 is tubular and a bearing block 69 is rotatably mounted thereto for rotation about the principal longitudinal axis of the arm 64. A clevis 70 forms a part of a castering kingpin assembly and is rotatably mounted to the block 69 for rotation about an axis lying perpendicular to the axis of rotation of the block 69. In this manner the clevis 70 is mounted for universal movement relative to the frame of the sidecar.

A bar 71 extends outwardly from the forward end of a castering and wheel support arm 72 and extends from the bottom of a hinge member 73 which is journaled in the clevis 70 for rotation about an axis lying perpendicular to the axis of rotation of the clevis 70 relative to the block 69. An arm 75 extends outwardly from the rear end of the support arm 72 and is hingedly connected to the support arm 64 by a hinge link 76. The lower end of the hinge link 76 is journaled for rotation on a bearing bolt assembly 77, and the upper end of the link 76 is journaled for rotation to the arm 75 by a bearing bolt assembly 78.

The sidecar wheel 16 is freely rotatable on an axle 80 which, as best shown in FIG. 6, is mounted to the castering support arm 72 by a spring mount assembly 81. The assembly 81 includes a spring and shock absorber 82 which is pivotably mounted at its lower end to the arm 72 and at its upper end to a generally triangular carrier assembly 83 which is pivotably mounted to the arm 20 by a pair of mounting plates 84. The axle 80 is fixed to and extends outwardly from the assembly 83.

In order to cause the sidecar body 14 and the sidecar wheel 16 to lean in substantial parallelism with the frame of the motorcycle, the body 14 and the castering assembly are connected to the frame of the motorcycle by a system of parallelogram linkages. Considered in greater detail and with particular reference to FIG. 2, this lean control linkage system includes a link 85 which is mounted at one end to the frame of the motorcycle by a conventional tie rod end fitting 85A for pivotal movement in a vertical plane when the motorcycle is in the upright position. Pivoted movement in a horizontal plane is also permitted by this fitting for purpose of alignment. The other end of the linkage 85 also includes a conventional tie rod end fitting 85B pivotably connected to the top of an unstanding tubular member 87 which is in turn pivotably connected at its lower end by the bracket 62 to the sidecar frame for pivotal movement about the pivot axis 63 of the sidecar body. The member 87 is affixed to the sidecar body mount 60 wherefor the body 14 leans with the frame of the motorcycle.

A link 89 also includes conventional tie rod end fittings 89A and 89B which enable adjustment of the length of the link. The fitting 89A is pivotably mounted to an intermediate location on the member 87, and the fitting 89B is pivotably connected to the upper end of a link 90 whose lower end is fixed to the rear end of a shaft 91 which is connected at its forward end by an arm 92 (FIG. 4) to a tie rod end fitting 93A of a link 93. The link 90 is not fully illustrated in FIG. 6, but extends upwardly between the rear end of the tube 26 and the fitting 89B. The shaft 91 is freely rotatable within the support tube 26. A tie rod end fitting 93B is provided at the outboard end of the link 93 and, as best shown in FIG. 6, is pivotably connected to an upstanding bracket arm 95 fixedly connected to and extending up from the clevis 70. It may be seen that the links 85 and 89 extend through vertical slots 96 and 97 in the sides of the sidecar body, and the member 87 extends through the bottom just aft of the mount 69. It may thus be seen that as the motorcycle leans counterclockwise from the upright position shown in FIG. 2 to the position shown in FIG. 1 the link 85 moves to the left causing the arm 87 and the sidecar body to which it is attached to pivot counterclockwise and remain in parallelism with the motorcycle frame. In addition, the castering support arm 72 is also pivoted by the lean control parallelogram linkages so as to remain in parallelism with the frame of the motorcycle. Accordingly, the motorcycle frame and the sidecar body are held in mutual parallel relationship. Moreover, the support arm 72 and the sidecar wheel 16 are also caused to lean with the sidecar body. However, as is more fully described hereinafter, the castering support arm 72 and the wheel 16 automatically lean to a lesser or greater extent to eliminate any drag or scuffing of the wheel 16 on the pavement or other driving surface.

In accordance with another feature of the invention, means are provided for locking the sidecar body and the sidecar wheel in an upright position thereby facilitating the parking and storing of the sidecar whether attached to a motorcycle or not. This locking mechanism includes a hand-operated lever 100 having a knob 101 at the top. The lever 100 has an elongated, horizontal portion 100A which extends under the sidecar body and is hingedly mounted to the sidecar body forwardly of the mount 60 by a hinge 103. More particularly, the hinge 103 is affixed to an angle bracket 104 (FIGS. 7 and 8) which is in turn affixed as by welding to the link 87 and to the rear sidecar body mount 59. A pair of lock members 106 and 107 are welded to the lever 100 and each includes an arcuate recess 108 at the bottom which in the locked position shown in FIG. 7 engage the rear horizontal sidecar frame member 27 to prevent any leaning or rocking of the sidecar body relative to the sidecar frame. This in turn prevents movement of the lean control linkage and thus holds the sidecar wheel 16 in a substantially upright position. If the sidecar is attached to a motorcycle frame, the motorcycle will also be held in an upright position by the lean control linkage. FIG. 8 shows the control lever 100 in the unlocked position wherein the locking brackets 106 and 107 have been swung out of interlocking relationship with the sidecar frame member 27 whereby the sidecar body and the sidecar wheel are free to lean relative to the sidecar frame.

As shown, the upstanding portion of the control lever 100 extends in proximity to the inboard side of the sidecar body and a detent bracket 110 is mounted to the body to hold the lever 100 in either the locked or the unlocked position. The lever 100 is preferably a steel bar and is sufficiently resilient to be sprung out of the detent notches 112 and 113 in the detent bracket 110 to permit movement of the control lever 100 between the locked and unlocked positions.

OPERATION

In order to better understand the manner in which the novel sidecar of the present invention automatically positions the sidecar body and the sidecar wheel to minimize drag whereby the associated motorcycle may be driven in substantially the same manner as though no sidecar were present, assume that the motorcycle is in the upright position shown in FIG. 2 and the lever 100 has been moved forwardly into the unlocked position. At this time it is necessary to use some outside force such as a kickstand or the legs of the cyclist to hold the motorcycle and the sidecar in an upright position.

From an inspection of FIG. 2 it may be seen that the frame of the motorcycle and the link 87 constitute equal and parallel arms of a parallelogram. Additionally, the portion of the link 87 between the pivot axis 63 and the pivot axis of the fitting 89A is equal in length and parallel to the link 90, and the link 90 connects to the caster support arm 72 via the shaft 91, the link 92 and the kingpin assembly. It may be seen from FIG. 2 that two parallelogram linkages thus extend through the rear of the sidecar body behind the passenger seat. From FIG. 4 it may be seen that a third parallelogram linkage which includes the links 92, 93, the clevice 70 and bracket arm 95 an th rigid frame arm 64, is connected by means of the shaft 91 to the rear set of parallelograms. Consequently, the clevice 70 and the sidecar body 14 are at all time parallel to the frame of the motorcycle. While the need for the second parallelogram at the rear could be avoided by placing the linkage assembly entirely at the front of the sidecar, the linkage would then reduce the leg room in the sidecar and it would also interfere with the normal movements of the cyclists. Therefore, I have found it preferable to mount the lean control linkage to the rear of the motorcycle and extend it through the rear of the sidecar body.

During normal cycling, a motorcycle is steered primarily by leaning it in the direction of the desired turn rather than by steering the front wheel. Since the sidecar wheel is spaced a considerable distance to one side of the principal longitudinal axis of the motorcycle it has a different turning radius than those of the motorcycle wheels whereby the same angle of the lean of the sidecar wheel and the motorcycle wheels will not cause the sidecar wheel to turn about the same point as do the motorcycle wheels whereby drag and tire scuffing would occur unless compensation for the different turning radii were provided. Moreover, the same lean angle will cause different turning radii depending upon the speed of the motorcycle, the centrifugal force and the road holding friction acting on it. For example, in a typical situation a lean angle of fifteen degrees will produce a turning radius of say ten to fifteen feet at a speed of about three to five miles per hour while the same lean angle will produce a turning radius up to about three hundred feet at sixty five miles per hour.

In accordance with the present invention the sidecar body and the sidecar wheel are steered to cause the sidecar wheel to turn about the same turning axis as the motorcycle at a speed about midway of the range in which normal cycling occurs, say 35 m.p.h. In addition, the sidecar wheel 16 is mounted on a caster assembly whereby it automatically casters from the steered position to the precise angular position where no side drag or scuffing occurs. With reference to FIG. 4 it may be seen that the greater the vertical distance between the locations on the motorcycle frame to which the fittings 32 and 41 are connected, the greater will be the degree of sidecar steering for a given angle of lean of the motorcycle.

As described above, the rear end of the caster support arm 20 is free to swing in and out under the forces exerted thereon by gravity, centrifugal force, and friction between the road surface and the sidecar wheel. Consequently, the caster assembly and the sidecar wheel 16 caster to the precise position where the drag is a minimum.

The stabilizer hinge assembly which connects the rear of the caster arm 72 to the sidecar frame prevents the caster assembly from swinging back and forth out of control. Being pivotally connected at the bottom to the frame and at the top to the castering arm 20, the link 76, as it moves, swings through an arc thereby to stabilize the castering assembly by balancing out the forces exerted on it by gravity and by centrifugal force.

Considering the stabilizer hinge assembly in greater detail, the caster support arm 72 as viewed in FIG. 2 from the rear is urged in a clockwise direction by the force of gravity. This in turn urges the link 76 to pivot in a clockwise direction about its lower pivot 77. During a turn, centrifugal force on the sidecar wheel and the castering assembly will urge the link 76 in either the same or opposite direction depending on the direction of the turn. This force will balance out any lean angle of the wheel 16 and castering assembly and hold the wheel in a stable angular position. However, an additional force will be exerted on the castering assembly by the friction between the road surface and the tire of the sidecar wheel until the road surface friction is the same on both sides of the tire, i.e., the turning axis of the wheel 16 is the same as that of the motorcycle.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A sidecar for a motorcycle having a main frame, comprising in combination
    a support frame,
    a sidecar body pivotably mounted to said support frame to permit pivotal movement of said body relative to said frame about a fore and aft axis, and
    means mounting said support frame to said main frame to steer said support frame in response to a lean of said main frame.

2. The combination set forth in claim 1, comprising a sidecar support wheel, and
    castering means mounting said wheel to said support frame.

3. The combination set forth in claim 2 wherein
    said castering means is connected at the front to said support frame by a universal connection, and
    hinge means pivotably connecting the rear of said castering means to said support frame.

4. The combination set forth in claim 3 wherein said hinge means comprises
    an arm pivotably connected at one end to said support frame and at the other end to said castering means.

5. The combination set forth in claim 4 wherein
    said one end of said arm is below said other end.

6. A sidecar for a motorcycle having a main frame, comprising in combination
    a support frame,
    a sidecar body,
    means pivotably mounting said body to said support frame to permit pivotal movement of said body about a fore and aft axis relative to said support frame,
    means pivotably mounting said support frame to said main frame of said motorcycle,
    first linkage means connected to said body and to said main frame of said motorcycle for causing said body to lean in parallelism with said main frame,
    a sidecar support wheel,
    means rotatably mounting said support wheel to said support frame,
    second linkage means connected between said frame of said motorcycle and said means rotatably mounting said support wheel for causing said support wheel to lean in substantial parallelism with said main frame of said motorcycle, and
    manually operable locking means for locking said body to said support frame to prevent relative pivotal movement between said body and said support frame,
    said manual locking means comprising a lever movably mounted to said body, and frame abutment means carried by said lever, said lever being movable between a locked position wherein said abutment means is lockingly engaged with said support frame and an unlocked position wherein said abutment means is disengaged from said support frame.

7. A sidecar according to claim 6 wherein
    said lever extends upwardly along the inboard side of said sidecar body.

8. A sidecar according to claim 6 comprising
    detent means for preventing spurious movement of said lever between said locked and unlocked positions.

9. A sidecar for a motorcycle having a main frame, comprising in combination
    a support frame,
    a sidecar body,
    means pivotably mounting said body to said support frame to permit pivotal movement of said body about a fore and aft axis relative to said support frame,
    means pivotably mounting said support frame to said main frame of said motorcycle,
    first linkage means connected to said body and to said main frame of said motorcycle for causing said body to lean in parallelism with said main frame,
    a sidecar support wheel, means rotatably mounting said support wheel to said support frame, second linkage means connected between said frame of said motorcycle and said means rotatably mounting said support wheel for causing said support wheel to lean in substantial parallelism with said main frame of said motorcycle, steering means connected between said main frame and said support frame for steering said support frame in response to a lean of said main frame.

10. A sidecar according to claim 9 wherein said steering means comprises a longitudinally extendible link pivotably connected at one end to said support frame and pivotably connected at the other end to a first location on said main frame, and a second link of fixed length connected between said support frame and a second location on said main frame, said first and second locations being vertically displaced from one another.

11. A sidecar according to claim 9 wherein said steering means is connected to the front portion of said sidecar support frame, and said means pivotably mounting said support frame to said main frame includes a strut of fixed length connected between said main frame and the rear portion of said support frame.

12. The combination of claim 9 comprising caster support means permitting said support wheel to caster with respect to said support frame.

13. The combination of claim 9 comprising caster support means permitting said support wheel to caster with respect to said support frame, said caster support means comprising an arm pivotably connected at one end to said support frame and at the other end to said caster support means, said one end being below said other end.

14. A sidecar for a motorcycle having a main frame, comprising in combination a support frame, a sidecar body, means pivotably mounting said body to said support frame to permit pivotal movement of said body about a fore and aft axis relative to said support frame, means pivotably mounting said support frame to said main frame of said motorcycle, first linkage means connected to said body and to said main frame of said motorcycle for causing said body to lean in parallelism with said main frame, a sidecar support wheel, means rotatably mounting said support wheel to said support frame, second linkage means connected between said frame of said motorcycle and said means rotatably mounting said support wheel for causing said support wheel to lean in substantial parallelism with said main frame of said motorcycle, caster support means permitting said support wheel to caster with respect to said support frame, and spring means mounting said support wheel to said caster support means.

15. A sidecar according to claim 14 comprising a universal connection connecting said castering means to said support frame.

16. A sidecar according to claim 15 wherein said second linkage means is connected to said castering means.

17. A sidecar according to claim 16 wherein said universal connection is connected to the front end of said castering means and hinge means connecting the rear end of said castering means to said support frame.

18. A sidecar for a motorcycle having a main frame, comprising in combination a support frame, a sidecar body, means pivotably mounting said body to said support frame to permit pivotal movement of said body about a fore and aft axis relative to said support frame, means pivotably mounting said support frame to said main frame of said motorcycle, first linkage means connected to said body and to said main frame of said motorcycle for causing said body to lean in parallelism with said main frame, a sidecar support wheel, means rotatably mounting said support wheel to said support frame, second linkage means connected between said frame of said motorcycle and said means rotatably mounting said support wheel for causing said support wheel to lean in substantial parallelism with said main frame of said motorcycle, caster support means permitting said support wheel to caster with respect to said support frame, and an arm pivotably connected at one end to said support frame and at the other end to said castering means.

19. A sidecar according to claim 18 wherein said one end of said arm is below said other end.

20. A sidecar according to claim 19 wherein said castering means comprises a rigid support member having outwardly extending arms at the front and rear ends respectively, said hinge arm being connected to the rearward one of said outwardly extending arms.

21. A sidecar for a motorcycle having a main frame, comprising in combination a support frame, a sidecar body, means pivotably mounting said body to said support frame to permit pivotal movement of said body about a fore and aft axis relative to said support frame, means pivotably mounting said support frame to said main frame of said motorcycle, first linkage means connected to said body and to said main frame of said motorcycle for causing said body to lean in parallelism with said main frame, a sidecar support wheel, means rotatably mounting said support wheel to said support frame, second linkage means connected between said frame of said motorcycle and said means rotatably mounting said support wheel for causing said support wheel to lean in substantial parallelism with said main frame of said motorcycle, a fore and aft rigid frame member having a rectangular crosssection, and said means pivotably mounting said support frame to said main frame comprises clamp means having a pair of clamp arms having mutually aligned holes therein, said arms each having an inner abutment surface complimentary to a respective one of the adjacent orthogonal surfaces of said rigid frame member, first and second clamping blocks each having a hole therethrough aligned with one another and with said holes in said clamp arms, said clamping blocks each having an inner abutment surface complimentary to another respective one of the adjacent orthogonal surfaces of said rigid frame member, and nut and bolt means extending through said holes for tightening said abutment surfaces against said rigid clamp member to prevent rotational movement of said clamp means relative to said rigid frame member.

22. A sidecar for a motorcycle, comprising in combination a support frame, means for mounting said frame to said motorcycle, a sidecar body mounted to said frame, a sidecare support wheel, a castering assembly rotatably carrying said wheel, said castering assembly being journaled to said frame forewardly of said wheel for pivotal movement in a plane containing the axis of rotation of said wheel, and a support arm pivotably connected at a first location thereon to said castering assembly and pivotably connected at a second location thereon to said frame, said first location being above said second location.

23. A sidecar according to claim 22 wherein said castering assembly is journaled to said frame by a universal connection.

24. A sidecar according to claim 23 comprising lean control means connected between said motorcycle and said castering assembly for causing said castering assembly and said wheel to lean in response to a lean of said motorcycle.

25. A sidecar according to claim 24 wherein said lean control means comprises parallelogram linkage means connected between said castering assembly and said motorcycle.

26. A sidecar according to claim 25 wherein said sidecar body is mounted to said frame for pivotal movement about a fore and aft axis, and said linkage means is connected to said sidecar body for causing said sidecar body to lean in response to a lean of said motorcycle.

27. A sidecar according to claim 26 comprising locking means for releasably locking said sidecar body to said frame to prevent relative movement between said body and said frame.

28. A castering assembly for journaling a support wheel to a body to be supported by said wheel, comprising a wheel support member, means rotatably mounting said wheel to said support member for rotation about a first axis, means for mounting said support member to said body for pivotal movement about a second axis disposed forwardly of the axis of rotation of said wheel, said first and second axes lying in mutually orthogonal planes, and a support arm connected to said support member for pivotal movement about a first axis and connected to said body for pivotal movement about a second axis, said second axis being below said first axis and parallel thereto.

* * * * *